(12) United States Patent
Kitagawa et al.

(10) Patent No.: US 10,393,536 B2
(45) Date of Patent: Aug. 27, 2019

(54) PROBE INFORMATION PROCESSING SYSTEM, METHOD FOR PROCESSING PROBE INFORMATION, AND TANGIBLE NON-TRANSITORY COMPUTER-READABLE STORAGE MEDIUM CONTAINING COMPUTER PROGRAM

(71) Applicant: TOYOTA MAPMASTER INCORPORATED, Nagoya-shi, Aichi-ken (JP)

(72) Inventors: Naoki Kitagawa, Nagoya (JP); Yumiko Yamashita, Nagoya (JP); Yoshihiro Ui, Nagoya (JP)

(73) Assignee: TOYOTA MAPMASTER INCORPORATED (JP)

( * ) Notice: Subject to any disclaimer, the term of this patent is extended or adjusted under 35 U.S.C. 154(b) by 48 days.

(21) Appl. No.: 15/882,161

(22) Filed: Jan. 29, 2018

(65) Prior Publication Data

US 2018/0216954 A1   Aug. 2, 2018

(30) Foreign Application Priority Data

Jan. 31, 2017   (JP) ................................ 2017-014962

(51) Int. Cl.
*G01C 21/36*   (2006.01)
*G01C 21/32*   (2006.01)
(Continued)

(52) U.S. Cl.
CPC ......... *G01C 21/3635* (2013.01); *G01C 21/32* (2013.01); *G01C 21/3602* (2013.01);
(Continued)

(58) Field of Classification Search
CPC ............................................................ G06T 15/06; G06T 15/00; G06T 7/10; G06T 17/05; G06T 7/35; G06T 17/00;
(Continued)

(56) References Cited

U.S. PATENT DOCUMENTS

2010/0034426 A1\*   2/2010   Takiguchi .......... G01C 21/3602
                                                                      382/106
2013/0060540 A1\*   3/2013   Frahm ..................... G06T 15/06
                                                                         703/2

FOREIGN PATENT DOCUMENTS

JP   2006170299 A   6/2006
JP   2007078774 A   3/2007
(Continued)

*Primary Examiner* — Behrang Badii
(74) *Attorney, Agent, or Firm* — Schmeiser, Olsen & Watts, LLP

(57) ABSTRACT

A probe information storing unit is provided to store therein probe information items of a vehicle, and a voxel storing unit is provided to store therein voxels, which are defined and later described, in association with position information of the respective voxels. The voxels are defined in a three-dimensional space based on map data. The voxel storing unit and the probe information storing unit are referred to, and the probe information items are given, as votes, to the voxels that correspond to position information of the respective probe information items. A statistical process is executed to the probe information items given to each of the voxels, and the process results are associated with the respective voxels.

21 Claims, 8 Drawing Sheets

(51) Int. Cl.
  *G06T 17/05* (2011.01)
  *G06F 16/29* (2019.01)
  *G06F 17/10* (2006.01)
  *G06T 15/00* (2011.01)
  *G06T 7/521* (2017.01)
  *G06T 15/06* (2011.01)
  *G06K 9/00* (2006.01)

(52) U.S. Cl.
  CPC .............. *G06F 16/29* (2019.01); *G06F 17/10* (2013.01); *G06K 9/00* (2013.01); *G06T 7/521* (2017.01); *G06T 15/00* (2013.01); *G06T 15/06* (2013.01); *G06T 17/05* (2013.01)

(58) Field of Classification Search
  CPC ....... G06T 7/521; G06T 7/174; G06T 7/0012; G06T 7/136; G06T 5/002; G06T 15/08; G06T 3/60; G06T 7/11; G06T 7/187; G06T 7/33; G06T 7/593; G01C 21/3602; G01C 21/3635; G01C 21/32; G06K 9/00; G06K 9/6377; G06K 9/6282; G06F 17/10; G06F 16/29; G06N 3/0454; G06N 3/084; G06N 3/04; G01V 1/306; G01V 1/30; G01V 1/302
  See application file for complete search history.

(56) References Cited

FOREIGN PATENT DOCUMENTS

| | | |
|---|---|---|
| JP | 2009204615 A | 9/2009 |
| JP | 2010230420 A | 10/2010 |
| JP | 2010287156 A | 12/2010 |
| JP | 2012185534 A | 9/2012 |
| JP | 2015108621 A | 6/2015 |
| JP | 2016103263 A | 6/2016 |
| WO | WO2007069726 A1 | 6/2007 |

\* cited by examiner

PROBE INFORMATION PROCESSING SYSTEM, METHOD FOR PROCESSING PROBE INFORMATION, AND TANGIBLE NON-TRANSITORY COMPUTER-READABLE STORAGE MEDIUM CONTAINING COMPUTER PROGRAM

CROSS-REFERENCE TO RELATED APPLICATION

This application claims priority to Japanese Application No. 2017-014962, having a filing date of Jan. 31, 2017, the entire contents of which are hereby incorporated by reference.

FIELD OF TECHNOLOGY

The following relates to a probe information processing system, a method for processing probe information, and tangible non-transitory computer-readable storage medium containing computer program.

BACKGROUND

Recently, due to the development of vehicle navigation techniques and the rapid development of automated driving techniques of vehicles, more attention has been paid to the use of probe information obtained from probe vehicles in order to provide more detailed map and road status information. However, depending on the probe information's target region and target period, the probe information data volume may grow to a petabyte scale because the number of the probe information items is very large and the volume of information included in each of the probe information items is also very large. Therefore, the system resources load for processing the above data volume has been increased further.

There are well known techniques, in which point cloud data sets representing positions and shapes of target objects are given, as votes, to each of the divided spaces (voxels) that are made by dividing a three-dimensional space into predetermined-sized spaces, and then the given point cloud data sets are converted into data for the respective voxels.

SUMMARY

An aspect relates to reducing the data volume of large probe information while keeping the characteristics of the probe information. As a result, the inventors came up with the following idea. Voxels are defined in a space having roads and structures based on the map data, and probe information items are given to the voxels that correspond to the position information of the probe information items. Then, a statistical process is executed to the probe information items given to each of the voxels, and the results of the statistical process are associated with the respective voxels.

The following is made in view of the above problem and the first aspect of the present invention is defined as follows. More specifically, the first aspect of the present invention is a probe information processing system comprising:

a probe information storing unit configured to store probe information items of a vehicle;

a first defining unit configured to define voxels in a three-dimensional space based on map data;

a voxel storing unit configured to store therein the voxels defined by the first defining unit in association with position information of the voxels;

a first voting unit configured to refer to the voxel storing unit and the probe information storing unit and give, as votes, the probe information items to the voxels that correspond to position information of the respective probe information items;

a first statistical processing unit configured to execute a statistical process to the probe information items given to each of the voxels by the first voting unit; and an associating unit configured to associate process results provided by the first statistical processing unit with the respective voxels.

The probe information processing system according to thus defined first aspect firstly defines voxels in the three-dimensional space based on the map data. Then, the probe information processing system gives, as the votes, the probe information items to the voxels that correspond to the position of the respective probe information items based on the position information of thus defined voxels and the position information of the probe information items. Then, the statistical process is executed to the probe information items given to each of the voxels, and the process results are associated with the respective voxels.

According to the probe information processing system defined above, because the multiple probe information items are collectively associated with the voxel, the data volume is reduced accordingly. In addition, because the information used for the above collective association is obtained through the statistical process for the multiple probe information items given to each of the voxels, characteristics of each of the probe information items are successfully reflected in the information associated with the respective voxel.

The second aspect of the present invention is defined as follows. More specifically, in the probe information processing system defined in the first aspect, the first defining unit defines, based on the map data and road information that corresponds to the map data, the voxels so that the voxels have different structures according to the road information.

According to the probe information processing system of the second aspect defined above, the road information is also referred to in addition to the map data when the voxels are defined. The characteristics of the probe information items that are received, as the votes, by the voxels are more influential when the size of the voxels is smaller. Therefore, voxels at a region (e.g., intersections) possibly having probe information items with various characteristics and voxels at another region (e.g., roadsides) having a possible new road are defined to have smaller sizes, and thereby the characteristics of each of the probe information items are reflected more in the results of the above statistical process. In contrast, voxels at a region (e.g., highways) possibly having probe information items with mutually similar characteristics are defined to have larger sizes so that the data volume is further reduced.

The third aspect of the present invention is defined as follows. More specifically, the third aspect of the present invention is the probe information processing system according to the first aspect further comprising a second defining unit configured to redefine structures of the voxels stored in the voxel storing unit based on road information that serves as the map data, wherein:

the voxel storing unit stores therein the redefined voxels; and the first voting unit gives, as the votes, the probe information items to the redefined voxels based on position information of the respective redefined voxels.

According to the probe information processing system of the third aspect defined above, the voxels that have been defined are redefined based on the road information. As described above, the characteristics of the probe information items that are received, as the votes, by the voxels are more influential when the size of the voxels is smaller. Therefore, voxels at a region (e.g., intersections) possibly having probe information items with various characteristics and voxels at another region (e.g., roadsides) having a possible new road are furthermore divided into smaller voxels to redefine the voxels, and thereby the characteristics of each of the probe information items are reflected more in the results of the above statistical process. In contrast, voxels at a region (e.g., highways) possibly having probe information items with mutually similar characteristics are integrated or merged into a large voxel to redefine the voxels so that the data volume is further reduced.

The fourth aspect of the present invention is define as follows. More specifically, the fourth aspect of the present invention is the probe information processing system according to the first aspect further comprising:

a second defining unit configured to redefine structures of the voxels stored in the voxel storing unit based on the process results of the first statistical processing unit and store the redefined voxels in the voxel storing unit;

a second voting unit configured to refer to the voxel storing unit and the probe information storing unit and give, as the votes, the probe information items to the redefined voxels that correspond to the position information of the respective probe information items; and a second statistical processing unit configured to execute a statistical process to the probe information items given by the second voting unit to each of the redefined voxels.

According to the probe information processing system of the fourth aspect defined above, the voxel that has been defined is redefined based on the statistical processing results of the probe information items for the defined voxel. When the result of the statistical processing to the defined voxel of interest indicates that there is a wide variation in the probe information items in the voxel of interest or that the statistical processing result for the voxel of interest is greatly different from the statistical processing result for the adjacent voxel located adjacent to the voxel of interest, the voxel is furthermore divided into smaller voxels to redefine the voxels. Thus, characteristics of each of the probe information item is reflected more in the result of the above statistical process. In contrast, the statistical processing result of the voxel of interest is equivalent to the statistical processing result of the adjacent voxel or a difference between the statistical processing results of the voxel of interest and the adjacent voxel falls within a predetermined range, the voxel of interest is merged with the adjacent voxel to define a large voxel for redefinition, and thereby the data volume is furthermore reduced.

The fifth aspect of the present invention is defined as follows. More specifically, the fifth aspect of the present invention is the probe information processing system according to the first aspect or the second aspect, wherein:

the voxels defined by the first defining unit includes a first voxel and a second voxel, each of which occupies an identical space, the first voxel receiving, as the vote, one of the probe information items satisfying a first condition, and the second voxel receiving, as the vote, another one of the probe information items satisfying a second condition different from the first condition;

the voxel storing unit stores therein the first voxel and the second voxel; and the first voting unit gives, as the votes, the one of the probe information items, which satisfies the first condition, to the first voxel and the another one of the probe information items, which satisfies the second condition, to the second voxel.

According to the probe information processing system of the fifth aspect defined above, it is possible to obtain the statistical processing result for each of the voxels under each of the predetermined desired conditions. As a result, it is possible that the different characteristics of the probe information items for different conditions are reflected in the information of the voxels. Examples of condition categories include a time slot, a day of a week, a month, a season, a weather. When the condition category is a time slot, a day of a week, a month, or a season, the time information of the probe information item may be used to give, as the vote, the probe information item to the voxel that corresponds to the time information of the respective probe information item. When the condition category is the weather, weather information of the probe information item may be used to give, as the vote, the probe information item to the voxel that corresponds to the weather information of the respective probe information item. The weather information may be obtained from the exterior of the vehicle, and may be determined based on information obtained from a device mounted on the vehicle (e.g., a rain detector, a wiper, a sunshine recorder, and a headlamp).

The sixth aspect of the present invention is defined as follows. More specifically, the sixth aspect of the present invention is the probe information processing system according to the first aspect or the second aspect, wherein:

the probe information items include occupancy region information that corresponds to a region occupied by the vehicle in the three-dimensional space; and the first voting unit gives, as the votes, the probe information items to all of the voxels, which overlap with the occupancy region information of the probe information items, based on the occupancy region information.

According to the probe information processing system of the sixth aspect defined above, it is possible to differentiate the influence of the probe information items on the voxels depending on the occupying region (e.g., a size of the vehicle).

The seventh aspect of the present invention is defined as follows. More specifically, the seventh aspect of the present invention is the probe information processing system according to the first aspect or the second aspect, wherein the voxel storing unit stores therein the voxels defined by the first defining unit in association with respective voxel identifiers, which identify the respective voxels, the probe information processing system further comprising:

an extended probe information generating unit configured to generate, depending on a size of the vehicle that serves as one of the probe information items given to one of the voxels by the first voting unit, an extended probe information item, which is given to an adjacent one of the voxels located adjacent to the one of the voxels that receives the one of the probe information items, in association with the voxel identifier of the adjacent voxel; and a second voting unit configured to give, as the vote, the extended probe information item to the adjacent one of the voxels that corresponds to the voxel identifier associated with the extended probe information item, wherein:

the first statistical processing unit executes the statistical process to the probe information items and the extended probe information item given to each of the voxels by the first voting unit and the second voting unit.

According to the probe information processing system of the seventh aspect defined above, it is possible to differentiate the influence of the probe information items on the voxels depending on the occupying region (e.g., a size of the vehicle).

In addition, the eighth aspect of the present invention is defined as follows. More specifically, the eighth aspect of the present invention is a method for processing probe information comprising the steps of:

storing probe information items of a vehicle in a probe information storing unit;

defining voxels in a three-dimensional space based on map data by using a first defining unit;

storing, in a voxel storing unit, the voxels defined by the defining of voxels in association with position information of the voxels;

referring to the voxel storing unit and the probe information storing unit and giving, as votes, the probe information items to the voxels that correspond to position information of the respective probe information items by using a first voting unit;

executing a statistical process to the probe information items given by the giving of the probe information items by using a first statistical processing unit; and associating process results of the executing of the statistical process with the respective voxels by using an associating unit.

According to embodiments of the invention of the eighth aspect defined above, it is possible to achieve advantages equivalent to those of the first aspect.

The ninth aspect of the present invention is defined as follows. More specifically, the ninth aspect of the present invention is the method according to the eighth aspect, wherein:

the defining of the voxels in the three-dimensional space includes defining, based on the map data and road information that corresponds to the map data, the voxels so that the voxels have different structures according to the road information.

According to embodiments of the invention of the ninth aspect defined above, it is possible to achieve advantages equivalent to those of the second aspect.

The tenth aspect of the present invention is defined as follows. More specifically, the tenth aspect of the present invention is the method according to the eighth aspect further comprising the step of:

redefining structures of the voxels stored in the voxel storing unit based on road information that serves as the map data by using a second defining unit, wherein;

the storing of the voxels in the voxel storing unit includes storing the redefined voxel in the voxel storing unit; and the giving of the probe information items includes giving, as the votes, the probe information items to the redefined voxels based on position information of the respective redefined voxels.

According to embodiments of the invention of the tenth aspect defined above, it is possible to achieve advantages equivalent to those of the third aspect.

The eleventh aspect of the present invention is defined as follows. More specifically, the eleventh aspect of the present invention is the method according to the eighth aspect further comprising the steps of:

redefining structures of the voxels stored in the voxel storing unit based on the process results of the executing of the statistical process and storing the redefined voxels in the voxel storing unit by using a second defining unit;

referring to the voxel storing unit and the probe information storing unit and giving, as the votes, the probe information items to the redefined voxels that correspond to position information of the respective probe information items by using a second voting unit; and executing a statistical process to the probe information items, which are given by the giving of the probe information items to the redefined voxels, to each of the redefined voxels by using a second statistical processing unit.

According to embodiments of the invention of the eleventh aspect defined above, it is possible to achieve advantages equivalent to those of the fourth aspect.

In the method for processing probe information defined in the eighth or ninth aspect of embodiments of the present invention, the voxels defined by the defining of the voxels include a first voxel and a second voxel, each of which occupies an identical space, the first voxel receiving, as the vote, one of the probe information items satisfying a first condition, the second voxel receiving another one of the probe information items satisfying a second condition different from the first condition;

the storing of the voxels in the voxel storing unit includes storing the first voxel and the second voxel in the voxel storing unit; and the giving of the probe information items includes giving, as the votes, the one of the probe information items, which satisfies the first condition, to the first voxel and the another one of the probe information items, which satisfies the second condition, to the second voxel.

According to embodiments of the invention of the twelfth aspect defined above, it is possible to achieve advantages equivalent to those of the fifth aspect.

In the method for processing probe information defined in the eighth or ninth aspect of embodiments of the present invention, the probe information includes occupancy region information that corresponds to a region occupied by the vehicle in the three-dimensional space; and the giving of the probe information items includes giving the probe information items to all of the voxels, which overlap with the occupancy region information of the probe information items, based on the occupancy region information.

According to embodiments of the invention of the thirteenth aspect defined above, it is possible to achieve advantages equivalent to those of the sixth aspect.

In the method for processing probe information defined in the eighth or ninth aspect of embodiments of the present invention, the storing of the voxels in the voxel storing unit includes storing the voxels, which are defined by the defining of the voxels, in association with respective voxel identifiers, which identify the respective voxels, the method further comprising the steps of:

generating, depending on a size of the vehicle that serves as one of the probe information items given to one of the voxels by the giving of the probe information items, an extended probe information item, which is given to an adjacent one of the voxels located adjacent to the one of the voxels that receives one of the probe information items, in association with the voxel identifier of the adjacent one of the voxels by using an extended probe information generating unit; and giving, as the vote, the extended probe information item to the adjacent one of the voxels that corresponds to the voxel identifier associated with the extended probe information item by using a second voting unit, wherein:

the executing of the statistical process further includes executing the statistical process to the probe information items and the extended probe information item given to each of the voxels by the giving of the probe information items and the giving of the extended probe information item.

According to embodiments of the invention of the fourteenth aspect defined above, it is possible to achieve advantages equivalent to those of the seventh aspect.

Furthermore, the fifteenth aspect of the present invention is defined as follows. More specifically, the fifteenth aspect of the present invention is a tangible non-transitory computer-readable storage medium containing a computer program for processing probe information, the computer program configured to cause a computer to function as:

probe information storing means for storing probe information items of a vehicle;

first defining means for defining voxels in a three-dimensional space based on map data;

voxel storing means for storing therein the voxels defined by the first defining means in association with position information of the voxels;

first voting means for referring to the voxel storing means and the probe information storing means and giving, as votes, the probe information items to the voxels that correspond to position information of the respective probe information items;

first statistical processing means for executing a statistical process to the probe information items given to each of the voxels by the first voting means; and associating means for associating process results provided by the first statistical processing means with the respective voxels.

According to embodiments of the invention of the fifteenth aspect defined above, it is possible to achieve advantages equivalent to those of the first aspect.

The sixteenth aspect of the present invention is defined as follows. More specifically, the sixteenth aspect of the present invention is the tangible non-transitory computer-readable storage medium according to the fifteenth aspect, wherein the first defining means defines, based on the map data and road information that corresponds to the map data, the voxels so that the voxels have different structures according to the road information.

According to embodiments of the invention of the sixteenth aspect defined above, it is possible to achieve advantages equivalent to those of the second aspect.

The seventeenth aspect of the present invention is defined as follows. More specifically, the seventeenth aspect of the present invention is the above tangible non-transitory computer-readable storage medium, where the computer program is further configured to cause the computer to function as second defining means for redefining structures of the voxels stored in the voxel storing means based on road information that serves as the map data, wherein:

the voxel storing means stores therein the redefined voxel; and the first voting means gives, as the votes, the probe information items to the redefined voxels based on position information of the respective redefined voxels.

According to embodiments of the invention of the seventeenth aspect defined above, it is possible to achieve advantages equivalent to those of the third aspect.

The eighteenth aspect of the present invention is defined as follows. More specifically, the eighteenth aspect of the present invention is the above tangible non-transitory computer-readable storage medium, where the computer program is further configured to cause the computer to function as:

second defining means for redefining structures of the voxels stored in the voxel storing means based on the process results of the first statistical processing means and store the redefined voxels in the voxel storing means;

second voting means for referring to the voxel storing means and the probe information storing means and give, as the votes, the probe information items to the redefined voxels that correspond to the position information of the respective probe information items; and second statistical processing means for executing a statistical process to the probe information items given by the second voting means to each of the redefined voxels.

According to embodiments of the invention of the eighteenth aspect defined above, it is possible to achieve advantages equivalent to those of the fourth aspect.

The nineteenth aspect of embodiments of the present invention is defined as follows. More specifically, the nineteenth aspect of the present invention is the tangible non-transitory computer-readable storage medium according to the fifteenth aspect or the sixteenth aspect, wherein:

the voxels defined by the first defining means includes a first voxel and a second voxel, each of which occupies an identical space, the first voxel receiving, as the vote, one of the probe information items satisfying a first condition, and the second voxel receiving, as the vote, another one of the probe information items satisfying a second condition different from the first condition;

the voxel storing means stores therein the first voxel and the second voxel; and the first voting means gives, as the votes, the one of the probe information items, which satisfies the first condition, to the first voxel and the another one of the probe information items, which satisfies the second condition, to the second voxel.

According to embodiments of the invention of the nineteenth aspect defined above, it is possible to achieve advantages equivalent to those of the fifth aspect.

The twentieth aspect of the present invention is defined as follows. More specifically, the twentieth aspect of the present invention is the tangible non-transitory computer-readable storage medium according to the fifteenth aspect or the sixteenth aspect, wherein:

the probe information items include occupancy region information that corresponds to a region occupied by the vehicle in the three-dimensional space; and the first voting means gives, as the votes, the probe information items to all of the voxels, which overlap with the occupancy region information of the probe information items, based on the occupancy region information.

According to embodiments of the invention of the twentieth aspect defined above, it is possible to achieve advantages equivalent to those of the sixth aspect.

The twenty-first aspect of the present invention is defined as follows. More specifically, the twenty-first aspect of the present invention is the tangible non-transitory computer-readable storage medium according to the fifteenth aspect or the sixteenth aspect, wherein the voxel storing means stores therein the voxels defined by the first defining means in association with respective voxel identifiers, which identify the respective voxels, the computer program further configured to cause the computer to function as:

extended probe information generating means for generating, depending on a size of the vehicle that serves as one of the probe information items given to one of the voxels by the first voting means, an extended probe information item, which is given to an adjacent one of the voxels located adjacent to the one of the voxels that receives the one of the probe information items, in association with the voxel identifier of the adjacent voxel; and second voting means for giving, as the vote, the extended probe information item to the adjacent one of the voxels that corresponds to the voxel identifier associated with the extended probe information item, wherein:

the first statistical processing means executes the statistical process to the probe information items and the extended probe information item given to each of the voxels by the first voting means and the second voting means.

According to embodiments of the invention of the twenty-first aspect defined above, it is possible to achieve advantages equivalent to those of the seventh aspect.

BRIEF DESCRIPTION

Some of the embodiments will be described in detail, with reference to the following figures, wherein like designations denote like members, wherein.

DETAILED DESCRIPTION

Embodiments and an example embodiment of the present invention will be described below with reference to drawings.

First Embodiment

Figure 1:
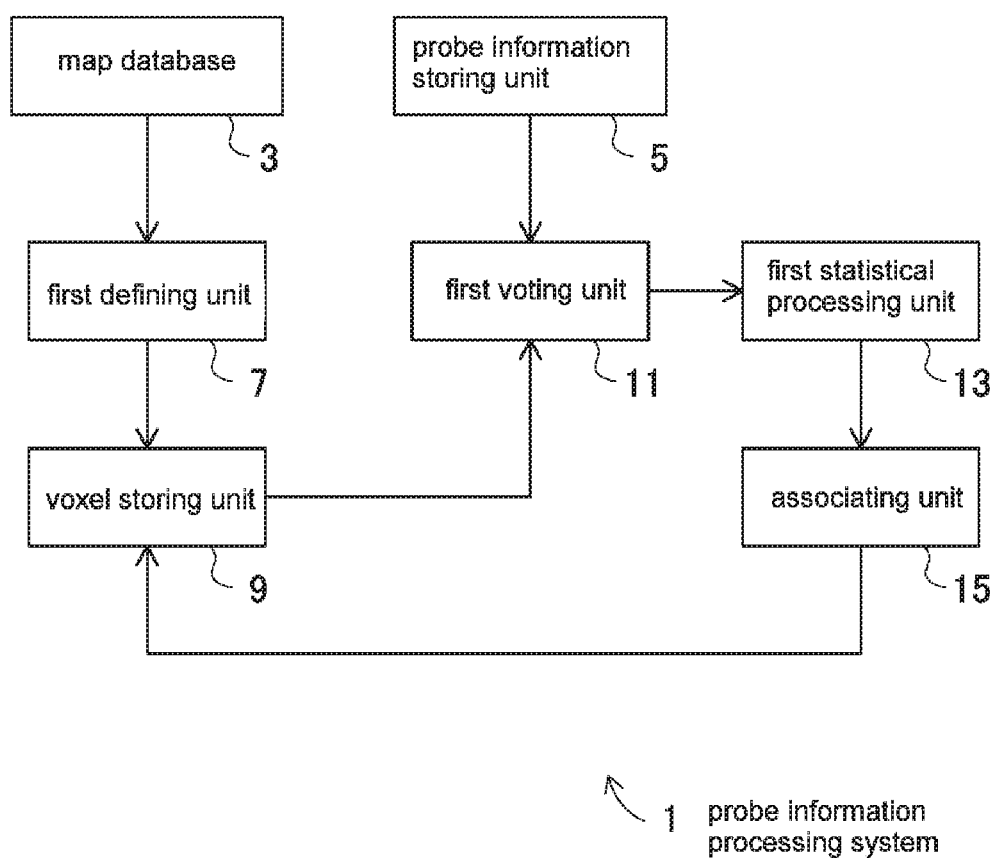
FIG. 1 is a block diagram illustrating a schematic configuration of a probe information processing system according to a first embodiment of the present invention.

FIG. 1 is a block diagram illustrating a schematic configuration of a probe information processing system 1 as one embodiment of the present invention.

As shown in FIG. 1, the probe information processing system 1 includes a map database 3, a probe information storing unit 5, a first defining unit 7, a voxel storing unit 9, a first voting unit 11, a first statistical processing unit 13 and an associating unit 15.

The map database 3 stores map data therein. The map data includes road-element-related information for defining map information, such as links and nodes, and other information that is drawn in a three-dimensional map, such as structures. The map data may be stored as image data or point cloud data obtained from a laser scanner, for example.

The probe information storing unit 5 stores therein probe information on vehicles. The probe information includes at least coordinate information, time information, and ID information for identifying probe vehicles. The coordinate information includes two-dimensional or three-dimensional coordinate information. Vehicles with a position detection function, such as a GPS, are capable of specifying the above coordinate information. The examples of other information in the probe information include speed, acceleration, brake, hard brake, direction indicator, steering wheel angle, headlamp, wiper, and friction coefficient ($\mu$: a frictional force developed on a contact surface between a tire and a road surface).

The first defining unit 7 defines voxels in a three-dimensional space based on the map data stored in the map database 3. For example, a three-dimensional space having the above road elements and structures may be divided into predetermined-sized spaces and then each of the divided spaces may be defined as a voxel, although methods for defining the voxels are not limited to the above method. The voxels may be defined at any space in the map data, and the space may be specified automatically or manually by an operator. Thus defined voxels may be associated with respective three-dimensional coordinates that serve as the position information. The voxel may be defined to form a cubic shape with a side length of 20 cm to 1 m, for example. The shape of the voxel is not limited to a cubic shape but may be a rectangular shape or a parallelepiped shape. In another example, the first defining unit 7 may define the voxels in the following alternative way. The three-dimensional space may be divided into sub spaces, each of which serves as a unit to be processed, and the defined sub spaces may be associated with respective three-dimensional coordinates. Then, each of the sub spaces may be divided into predetermined-sized spaces, and the divided spaces may be defined as voxels. The position information associated with thus defined voxel may be the three-dimensional coordinate for the corresponding sub space that includes the voxel of interest. Alternatively, the position information associated with thus defined voxel may be a voxel identifier indicating a positional relation between the voxels within the corresponding sub space. In the above case, a three-dimensional coordinate for the voxel in the three-dimensional space may be calculated based on the three-dimensional coordinate associated with the corresponding sub space and the voxel identifier of the voxel. The above process of dividing the space into sub spaces may be executed by the first defining unit 7 or may be alternatively executed by another processing unit that is not illustrated. Thus defined voxels are stored in the voxel storing unit 9 in association with the corresponding position information.

The first voting unit 11 refers to the voxel storing unit 9 and the probe information storing unit 5 and gives, as a vote, each of the probe information items stored in the probe information storing unit 5, to a target voxel that corresponds to the position information of the probe information item. Examples of voting methods include giving, as the vote, the probe information item, to a voxel, which is specified by the probe information item, based on the position information of the probe information item, although the voting methods are not limited to the above. The position information of the probe information item may be a position specified by a GPS device mounted on a probe vehicle.

The first statistical processing unit 13 executes a statistical process to the probe information items given to each of the voxels by the first voting unit 11. Methods for executing the statistical process are not limited to any specific method as long as the method is capable of reducing the data volume of the probe information item of each voxel. The data volume may be reduced when not every probe information item given to the voxel of interest is stored for the respective voxel. For example, only information that indicates the number of the probe information items given to the voxel or information that indicates representative information of the probe information items given to the voxel is stored. Examples of the information to be stored in the former case include "the number of the probe information items: 10" when 10 sets of the probe information are given as the votes to the voxel. When the probe information includes speed information, examples of the information to be stored in the latter case include an average speed, a maximum speed, and a minimum speed of the probe information items given as the votes to the voxel. The above information items may be processed on every specific day of a week or on every time slot based on time information in the probe information.

The associating unit 15 associates a process result, which is provided by the first statistical processing unit 13, with the corresponding voxel. For example, the associating unit 15 may associate the process result with a representative point of the corresponding voxel (e.g., a coordinate of a center point of the voxel). As another example, when a voxel identifier is provided to the voxel, the associating unit 15 may associate the process result with the voxel identifier. The information associated with the voxel may be stored in the voxel storing unit 9, for example.

Figure 2:
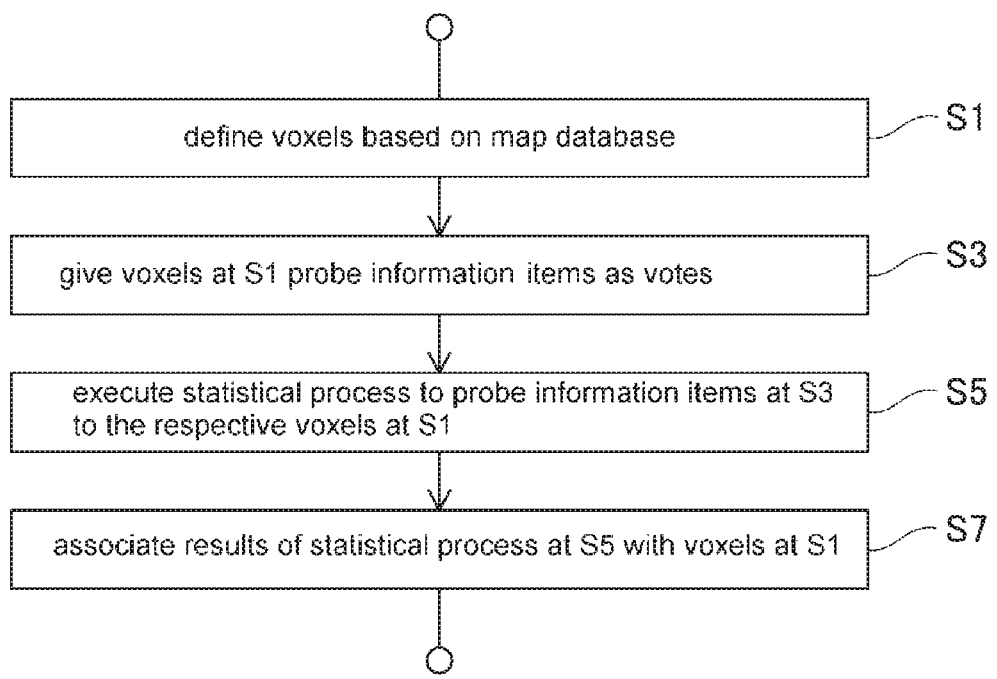
FIG. 2 is a flow chart explaining one operation example of the probe information processing system according to the first embodiment of the present invention.

FIG. 2 is a flow chart describing one example of an operation of the probe information processing system 1 according to the first embodiment illustrated in FIG. 1.

At step 1, the first defining unit 7 defines the voxels in the three-dimensional space based on the map data stored in the map database 3.

At step 3, the first voting unit 11 gives, as the votes, the voxels defined at step 1 the probe information items, which correspond to the position information of respective voxels.

At step 5, the first statistical processing unit 13 executes the statistical process to the probe information items given as the votes at step 3 to the respective voxels defined at step 1.

At step 7, the associating unit 15 associates the results of the statistical process executed at step 5 with the voxels defined at step 1.

Second Embodiment

Figure 3:
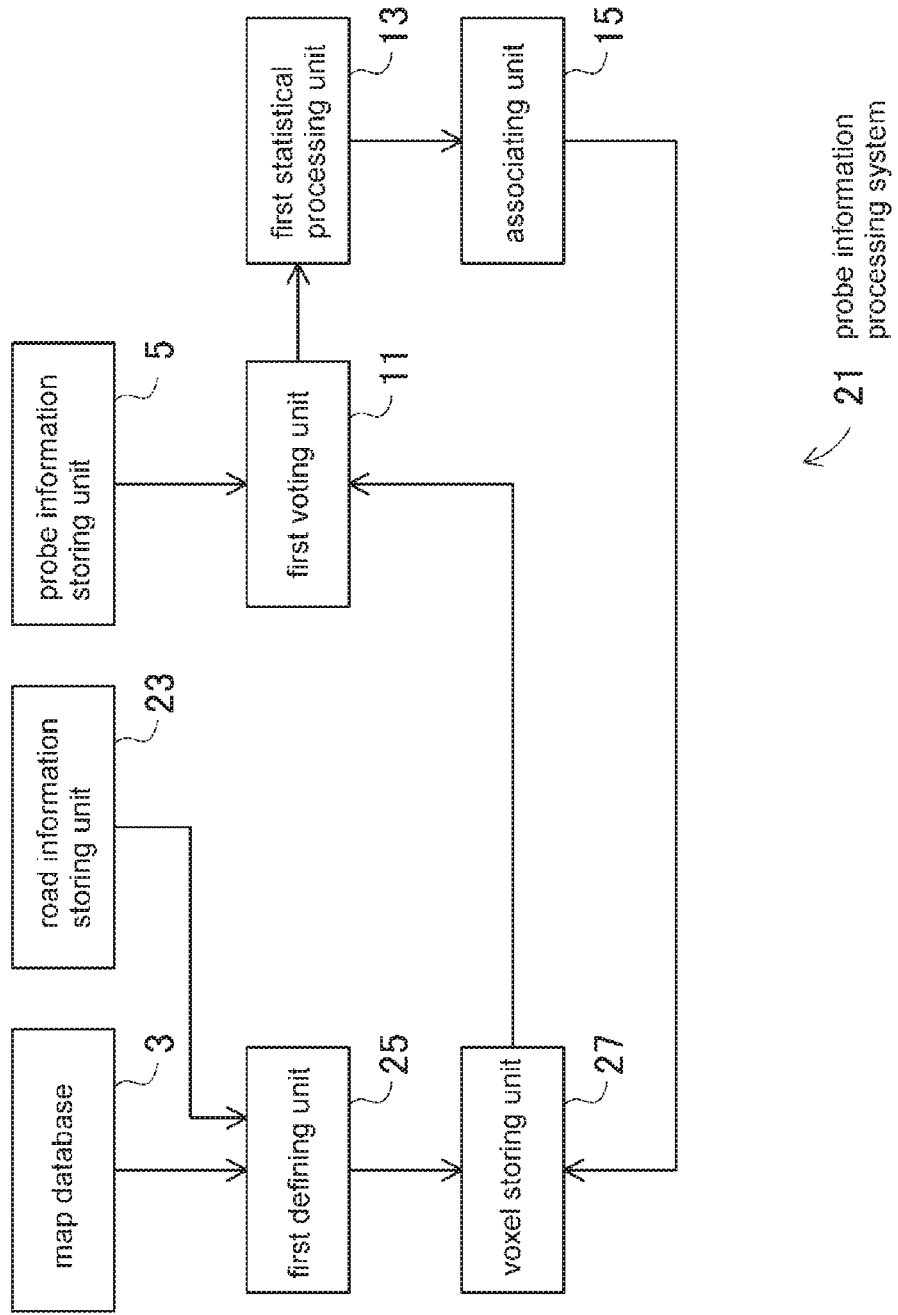
FIG. 3 is a block diagram illustrating a schematic configuration of a probe information processing system according to a second embodiment of the present invention.

FIG. 3 is a block diagram illustrating a schematic configuration of a probe information processing system 21 as one embodiment of the present invention. When compared with the probe information processing system 1 of the first embodiment, the probe information processing system 21 according to the second embodiment alternatively includes a first defining unit 25 and a voxel storing unit 27 instead of the first defining unit 7 and the voxel storing unit 9 of the probe information processing system 1. In addition, the probe information processing system 21 further includes a road information storing unit 23. In FIG. 3, components similar to those in FIG. 1 are indicated by the same numerals and the explanation thereof will be partially omitted.

The road information storing unit 23 stores road information that defines characteristics of each of road elements, such as roads and intersections. Examples of the road information include link information, which defines roads and characteristics of the roads, and node information, which defines intersections and characteristics of the intersections. Examples of the link information include coordinates of link, type of road, route number, length of link, existence or nonexistence of a vehicle weight limit, existence or nonexistence of a vehicle height limit, number of traffic lanes, roadway width, and traffic regulations, such as a speed limit. In addition, examples of the node information include coordinates of node, type of node, number of connected links, and existence or nonexistence of signals.

The first defining unit 25 refers to the map database 3 and the road information storing unit 23 and defines, based on the map data and the road information that corresponds to the map data, the voxels that have different structures according to the road information. Examples of methods for defining the voxels include defining a small voxel for a region identified as an intersection or a roadside in the map data, although the methods for defining the voxels are not limited to the above. In the above example, more specifically, the small voxel may have sides, all of which are short. In another example, a region identified as a highway in the map data, may be defined as a large voxel. In the above case, the large voxel may have sides, all of which are long, or may have long sides in a longitudinal direction of the highway. Thus defined voxels are stored in the voxel storing unit 27 in association with the respective position information.

Third Embodiment

Figure 4:
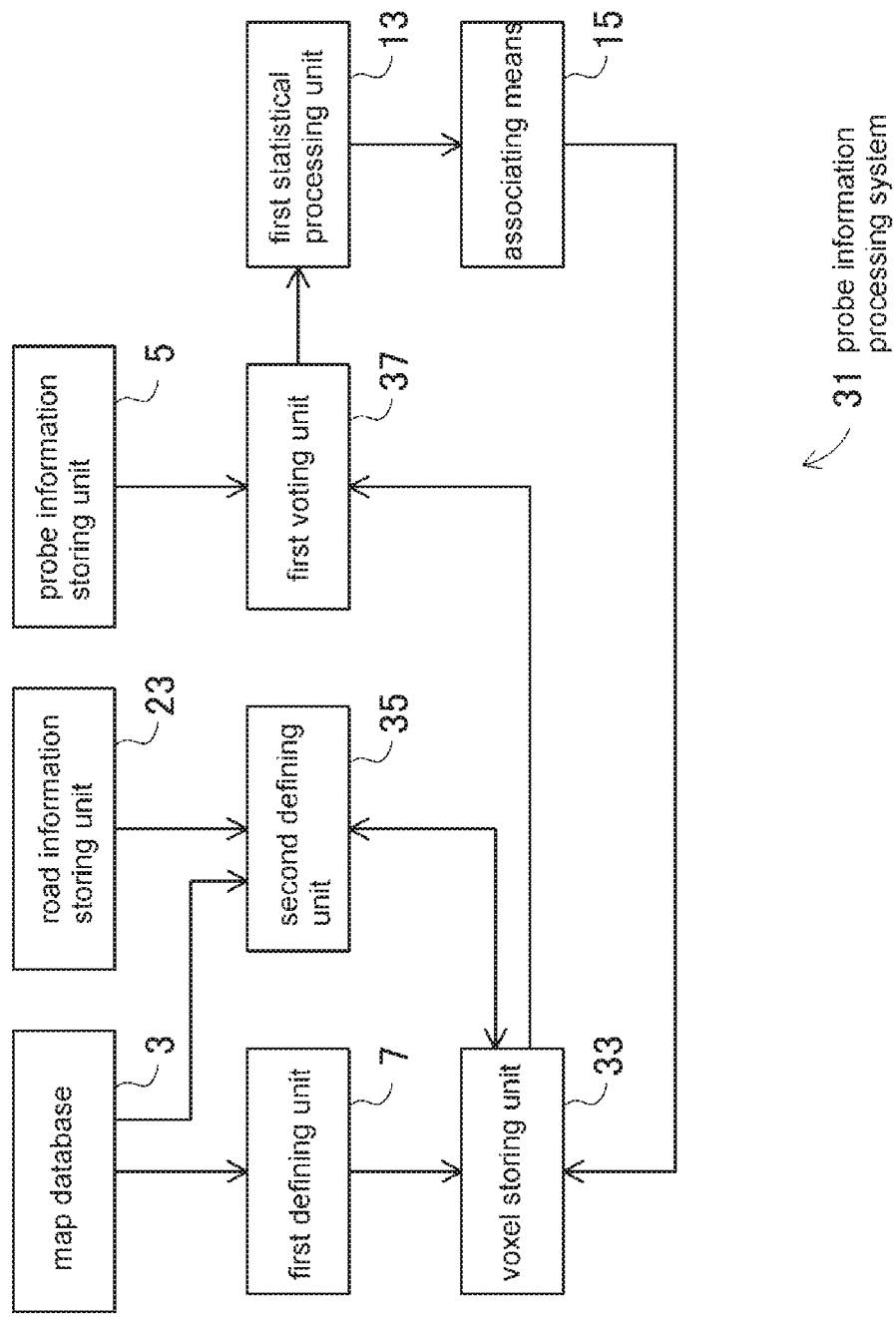
FIG. 4 is a block diagram illustrating a schematic configuration of a probe information processing system according to a third embodiment of the present invention.

FIG. 4 is a block diagram illustrating a schematic configuration of a probe information processing system 31 as one embodiment of the present invention. When compared with the probe information processing system 1 of the first embodiment, the probe information processing system 31 according to the third embodiment alternatively includes a voxel storing unit 33 and a first voting unit 37 instead of the voxel storing unit 9 and the first voting unit 11 of the probe information processing system 1. In addition, the probe information processing system 31 further includes the road information storing unit 23 and a second defining unit 35. In FIG. 4, components similar to those in FIGS. 1 and 3 are indicated by the same numerals and the explanation thereof will be partially omitted.

The second defining unit 35 refers to the map database 3 and the road information storing unit 23 and redefines the structures of the voxels stored in the voxel storing unit 33 based on the road information that corresponds to the map data. More specifically, the second defining unit 35 redefines, based on the road information, the structures of the voxels defined by the first defining unit 7. Examples of methods for redefining the voxel include dividing the voxel, which is defined in a region identified as the intersection or the roadside in the map data, into smaller voxels for redefinition, although the methods for redefining the voxel are not limited to the above. In other case, the voxels, which are defined in a region identified as the highway based on the map data, may be merged into a larger voxel for redefinition. The following method is capable of selecting a voxel targeted for redefinition from the voxels defined by the first defining unit 7. For example, the node coordinate, which relates to an intersection, stored in the road information storing unit 23 is used to select the target voxel defined in a certain region in the map data that corresponds to the node coordinate. Thus redefined voxel is stored in the voxel storing unit 33 in association with the position information of the redefined voxel to replace the original voxel defined by the first defining unit 7 or together with the original voxel.

The first voting unit 37 refers to the voxel storing unit 33 and the probe information storing unit 5 and gives, as the votes, the probe information items stored in the probe information storing unit 5 to the voxels, which are redefined by the second defining unit 35, based on the respective position information of the redefined voxels. The first voting unit 37 functions similarly to the first voting unit 11, except for the above.

Fourth Embodiment

Figure 5:
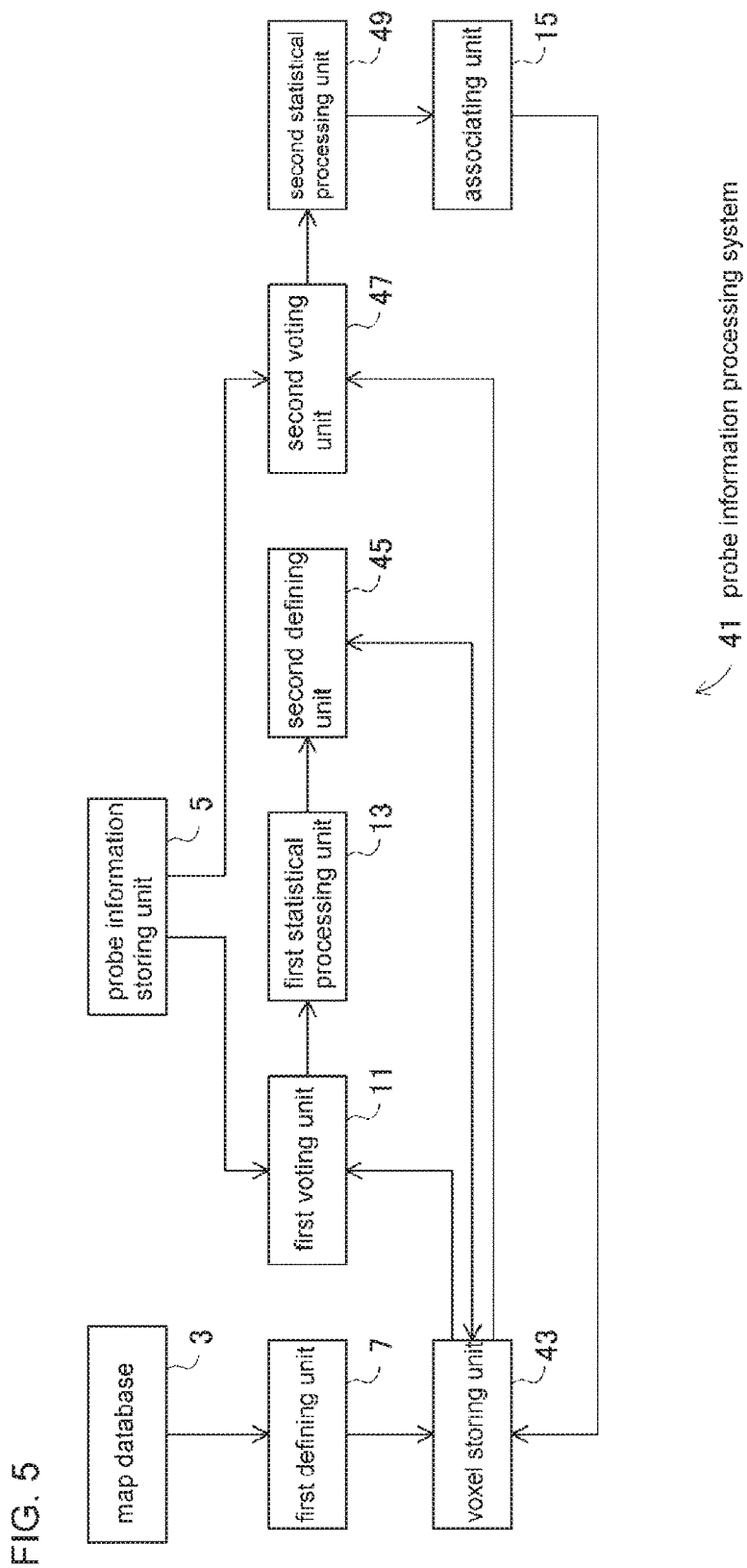
FIG. 5 is a block diagram illustrating a schematic configuration of a probe information processing system according to a fourth embodiment of the present invention.

FIG. 5 is a block diagram illustrating a schematic configuration of a probe information processing system 41 as one embodiment of the present invention. When compared with the probe information processing system 1 of the first embodiment, the probe information processing system 41 according to the fourth embodiment alternatively includes a voxel storing unit 43 instead of the voxel storing unit 9 of the probe information processing system 1. In addition, the probe information processing system 41 further includes a second defining unit 45, a second voting unit 47, and a second statistical processing unit 49. In FIG. 5, components similar to those in FIGS. 1, 3 and 4 are indicated by the same numerals and the explanation thereof will be partially omitted.

The second defining unit 45 refers to the first statistical processing unit 13 and the voxel storing unit 43 and redefines the structures of the voxels stored in the voxel storing unit 43 based on the process results of the first statistical processing unit 13. More specifically, the second defining unit 45 redefines the structures of the voxels defined by the first defining unit 7 based on the process results of the first statistical processing unit 13. Examples of methods for redefining the voxels include merging a targeted voxel (target voxel) with a voxel (adjacent voxel) located adjacent to the target voxel in a following way, although the methods for redefining the voxels are not limited to the followings. In a case where the result of the statistical processing indicates the number of the probe information items, the target voxel may be merged with the adjacent voxel when the number of the probe information items for the target voxel is equivalent to the number of the probe information items for the adjacent voxel or when a difference between the numbers of the probe information items for the target and adjacent voxels falls within a predetermined range. The above method is also applicable in a case where the result of the statistical processing indicates the average speed. For example, the target voxel may be merged with the adjacent voxel when an average speed calculated for the target voxel is equivalent to an average speed calculated for the adjacent voxel or when a difference between the average speeds calculated for the target and adjacent voxels falls within a predetermined range. When the condition for merging the voxels is satisfied, another voxel located adjacent to the above merged voxels may be further merged with the merged voxels. The redefined voxel is stored in the voxel storing unit 43 in association with the position information of the redefined voxel to replace the original voxel defined by the first defining unit 7 or together with the original voxel.

The second voting unit 47 refers to the voxel storing unit 43 and the probe information storing unit 5 and gives, as the votes, each of the probe information items stored in the probe information storing unit 5 to the voxels, which correspond to the respective position information of the probe information items and which are redefined by the second defining unit 45. The second voting unit 47 functions similarly to the first voting unit 11, except for the above.

The second statistical processing unit 49 executes the statistical process to the respective probe information items given to each of the redefined voxels by the second voting unit 47. The second statistical processing unit 49 functions similarly to the first statistical processing unit 13, except for the above.

Fifth Embodiment

A probe information processing system according to the fifth embodiment, which serves as one embodiment of the present invention, is configured to make components of the probe information processing system 1 illustrated in FIG. 1 function in the following way. The explanation of components that function similarly to those of the probe information processing system 1 will be omitted.

The first defining unit 7 defines multiple voxels that occupy an identical space. More specifically, the first defining unit 7 defines a first voxel and a second voxel, each of which occupies the identical space. In the above, the first voxel receives, as the vote, the probe information that satisfies a first condition and the second voxel receives, as the vote, the probe information that satisfies a second condition different from the first condition. For example, different voxels may be defined based on different conditions in a certain category, such as a time slot, a day of a week, a month, and a season. In addition, different voxels may be defined based on different conditions in another category, such as a weather and brightness. In an example for defining the voxels based on the time slot, the different voxels may be defined for different conditions, such as a first condition of "0:00 to 6:00", a second condition of "6:00 to 9:00", a third condition of "9:00 to 17:00", a fourth condition of "17:00 to 20:00", and a fifth condition of "20:00 to 0:00".

The first voting unit 11 gives, as the vote, probe information, which satisfies the first condition, to the first voxel and probe information, which satisfies the second condition, to the second voxel. For example, there is a case, where different voxels are defined for different conditions for the time slot as above and the time information (e.g., time for acquiring the probe information) of the probe information of interest indicates 7:30. In the above case, because the time information as well as the position information of the probe information of interest are referred to, the probe information of interest is given to the voxel of the second condition, which receives, as the vote, the probe information with the time information ranging from 6:00 to 9:00.

The first statistical processing unit 13 executes the statistical process to the probe information items, which are given by the first voting unit 11 to each of the different voxels defined based on different conditions. Then, the associating unit 15 associates the process results of the first statistical processing unit 13 with respective voxels.

Sixth Embodiment

A probe information processing system according to the sixth embodiment, which serves as one embodiment of the present invention, is configured to make components of the probe information processing system 1 illustrated in FIG. 1 function in the following way. The explanation of components that function similarly to those of the probe information processing system 1 will be omitted.

Figure 6:
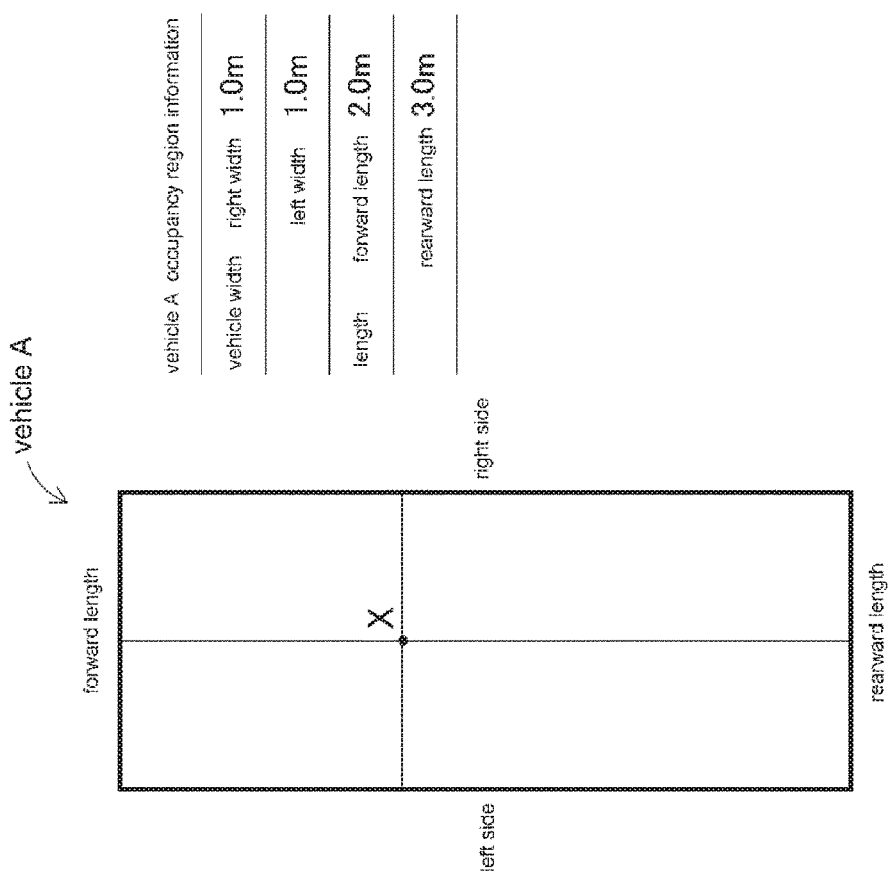
FIG. 6A is an explanatory diagram explaining one example of occupancy region information for a vehicle stored in a probe information storing unit of a probe information processing system according to a sixth embodiment of the present invention.
FIG. 6B is an explanatory diagram explaining one example of a voting process of a first voting unit of the probe information processing system according to the sixth embodiment of the present invention.

The probe information storing unit 5 stores therein occupancy region information, which serves as probe information on the vehicle, and which corresponds to an occupancy region occupied by the vehicle in the three-dimensional space. Examples of the occupancy region information on the vehicle include width of the vehicle, height of the vehicle, and length of the vehicle. The occupancy region information may be initially provided to serve as the probe information. Alternatively, if information relating to vehicle models is provided to serve as the probe information, the occupancy region information may be calculated based on the vehicle model. The occupancy region information is preferably set with respect to a reference point, which is a position of a GPS device mounted on the vehicle. When a vehicle A has a width of 2.0 m and a length of 5.0 m, and has a GPS device mounted at a point X as illustrated in FIG. 6A, the occupancy region information for the vehicle A may be set with respect to the point X that serves as the reference point. Thus, the occupancy region information for the vehicle A may be stored as a vehicle width of "a right width of 1.0 m, a left width of 1.0 m" and a length of "a forward length of 2.0 m, and a rearward length of 3.0 m."

Based on the above occupancy region information, the first voting unit 11 gives, as the votes, each probe information stored in the probe information storing unit 5 to all of the voxels that overlap with the occupancy region information of the probe information. For example, in a case where voxels 1 to 66 with sides of 0.5 m are defined as illustrated in FIG. 6B, the probe information for the vehicle A is given not only to the voxel 28 that corresponds to the position information indicated by the GPS device, but also to each of the voxels 2 to 6, 8 to 12, 14 to 18, 20 to 24, 26 to 30, 32 to 36, 38 to 42, 44 to 48, 50 to 54, 56 to 60, 62 to 66 that overlap with the occupancy region information for the vehicle A. In another example, the occupancy region information may be the vehicle width and the first voting unit 11 may give the probe information items, as the votes, to all of the voxels that overlap with the occupancy region information in a width direction of the vehicle with respect to the position of the GPS device. In the above case, the first voting unit 11 gives the probe information items, as the votes, to the voxels 26 to 30. When the first voting unit 11 gives, as the votes, the probe information items to each of the voxels, flags may be used for distinguishing probe information items given based on the position of the GPS device from probe information items given based on the occupancy region information without consideration of the position of the GPS device.

The first statistical processing unit 13 executes the statistical process to the probe information items given by the first voting unit 11 to each of the voxels. When flags are used for distinguishing the probe information items given based on the position of the GPS device from the probe information items given based on the occupancy region information without consideration of the position of the GPS device as described above, during the statistical process, there may be a process for differentiating the influence on the statistical processing results between the probe information items given based on the position of the GPS device and the probe information items given based on the occupancy region information without consideration of the position of the GPS device. In the above, for example, in order to reduce the influence on the statistical processing result made by the probe information items of the latter case relative to that made by the probe information items of the former case, the statistical process uses a value made by multiplying the probe information of the latter case by a predetermined coefficient less than 1.

Seventh Embodiment

Figure 7:
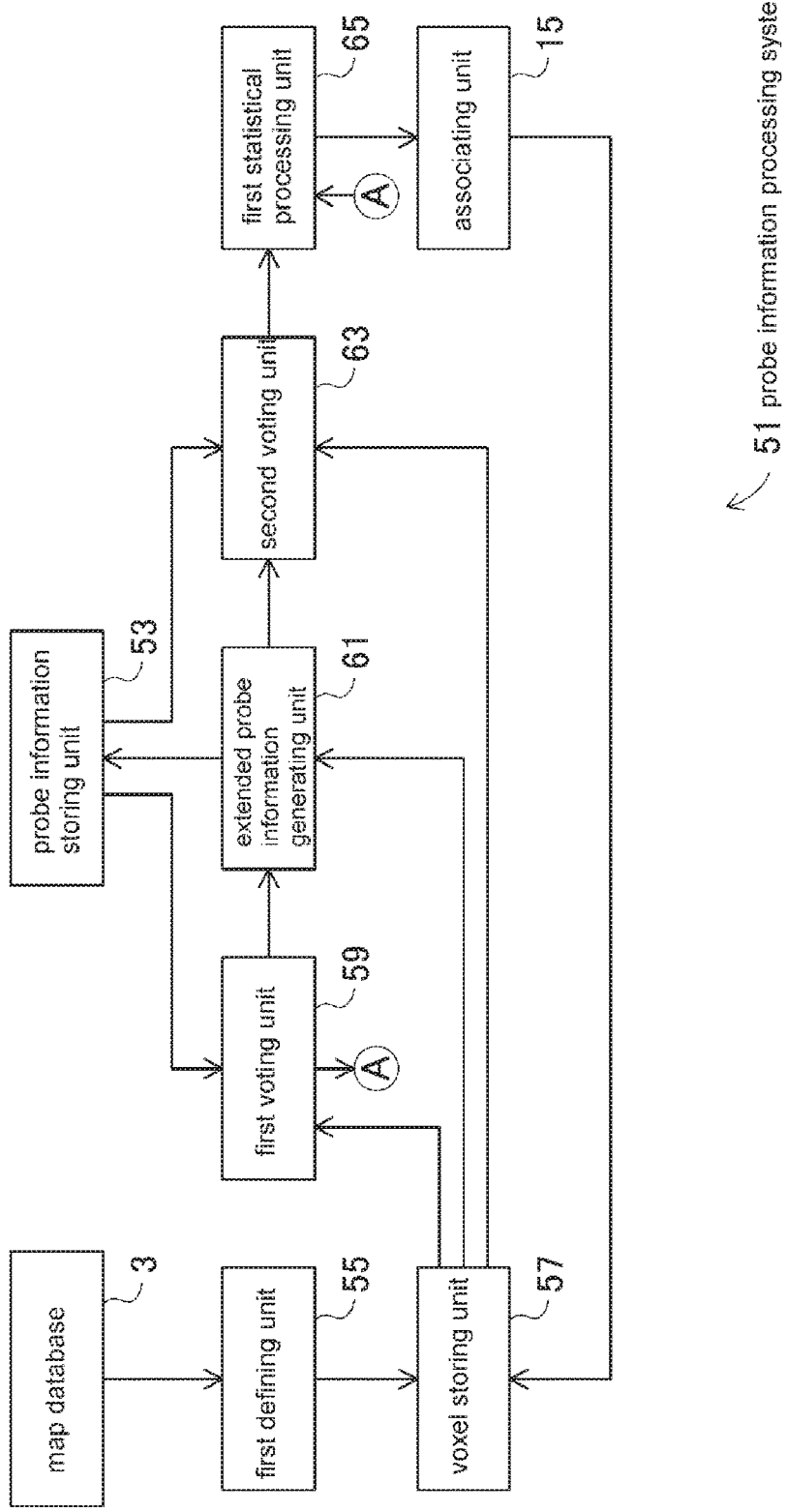
FIG. 7 is a block diagram illustrating a schematic configuration of a probe information processing system according to a seventh embodiment of the present invention.

FIG. 7 is a block diagram illustrating a schematic configuration of a probe information processing system 51 as one embodiment of the present invention. The probe information processing system 51 according to the seventh embodiment includes the map database 3, a probe information storing unit 53, a first defining unit 55, a voxel storing unit 57, a first voting unit 59, an extended probe information generating unit 61, a second voting unit 63, a first statistical processing unit 65 and the associating unit 15. In FIG. 7, components similar to those in FIGS. 1, 3, 4 and 5 are indicated by the same numerals and the explanation thereof will be partially omitted.

The probe information storing unit 53 further stores therein information relating to a size of the vehicle as the probe information on the vehicle. The information relating to the size of the vehicle may be the occupancy region information that corresponds to the region occupied by the vehicle in the three-dimensional space. Also, the probe information storing unit 53 stores therein extended probe information and voxel identifiers of the voxels that receives the respective extended probe information as the vote. The extended probe information is generated by the extended probe information generating unit 61, which will be described later.

The first defining unit 55 divides, based on the map data stored in the map database 3, the three-dimensional space into sub spaces, each of which serves as a unit to be processed, and the defined sub spaces may be associated with respective three-dimensional coordinates. Then, the first defining unit 55 divides each of the sub spaces into predetermined-size spaces that are defined as voxels. The above voxels are associated with respective voxel identifiers that indicate a positional relation between the voxels within the corresponding sub space. Thus defined voxels are stored in the voxel storing unit 57 in association with the respective voxel identifiers and the respective three-dimensional coordinates of the corresponding sub spaces.

The first voting unit 59 refers to the voxel storing unit 57 and the probe information storing unit 53 and gives, as the vote, each of the probe information items stored in the probe information storing unit 53 to a target voxel that corresponds to the position information of each of the probe information items. Examples of voting methods include tentatively assigning each of the probe information items to a sub space that corresponds to the position of the respective probe information item based on the position information of the probe information items and the three-dimensional coordinates of the sub spaces. Then, the method gives, as the vote, the assigned probe information item to the target voxel, which is specified by the probe information item, based on the voxel identifier for the voxel defined within the sub space.

The extended probe information generating unit 61 generates an extended probe information item, which is given to a voxel adjacent to a target voxel depending on a vehicle size that corresponds to the probe information item given to the target voxel by the first voting unit 59. In the above, the extended probe information item is generated in association with a voxel identifier of the adjacent voxel. The above extended probe information item may be a duplication of the probe information item that is given to the target voxel.

Alternatively, the extended probe information item may be a different probe information item that has less influence on a later-described statistical process than that of the probe information item given to the target voxel. An example of a method for generating the extended probe information item includes specifying voxel identifiers for voxels, which occupy the space corresponding to a vehicle width, based on a voxel identifier of the target voxel and a size of the target voxel. In the above method, the target voxel receives the probe information item given by the first voting unit 59, and the vehicle width serves as the vehicle size associated with the probe information item given to the target voxel. Then, the method associates the extended probe information item with the above specified voxel identifiers.

The second voting unit 63 refers to the voxel storing unit 57 and the probe information storing unit 53 and gives, as the vote, the extended probe information generated by the extended probe information generating unit 61 to the adjacent voxel that corresponds to the voxel identifier associated with the extended probe information. The extended probe information may be given to the adjacent voxel as one vote such that the extended probe information has influence on the later-described statistical process equivalent to that of the probe information given by the first voting unit 59. Alternatively, in order to reduce the influence on the later-described statistical process, the extended probe information may be given to the adjacent voxel as a value (e.g., as a half vote) computed by multiplying one vote by a predetermined coefficient less than 1.

The first statistical processing unit 65 executes a statistical process to the probe information items that are given to each of the voxels by the first voting unit 59 and by the second voting unit 63. The first statistical processing unit 65 functions similarly to the first statistical processing unit 13, except for the above.

First Example Embodiment

Figure 8:
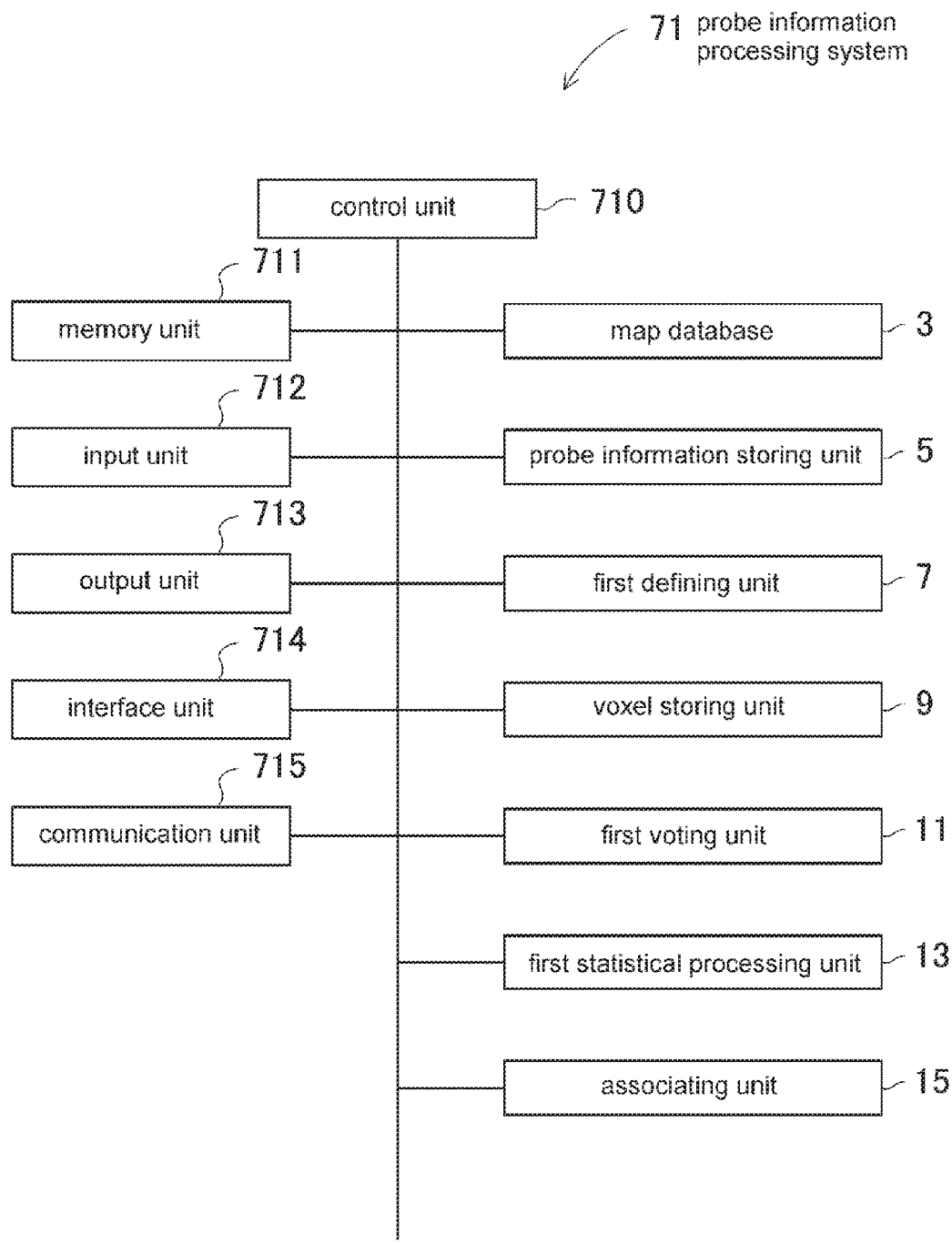
FIG. 8 is a block diagram illustrating a schematic configuration of a probe information processing system according to a first example embodiment of the present invention.

FIG. 8 is a block diagram illustrating a schematic configuration of a probe information processing system 71 as one example embodiment of the present invention. The probe information processing system 71 according to the seventh embodiment further includes a control unit 710, a memory unit 711, an input unit 712, an output unit 713, an interface unit 714 and a communication unit 715 in addition to the components that configure the probe information processing system 1 according to the first embodiment. In FIG. 8, components similar to those in FIGS. 1, 3, 4, 5 and 7 are indicated by the same numerals and the explanation thereof will be partially omitted.

The control unit 710 is a computer device, which includes a buffer memory and other devices, and the control unit 710 controls other components that configure the probe information processing system 71.

The memory unit 711 stores therein a computer program, and the computer program is read by the control unit 710, which serves as the computer device, so that the control unit 710 functions accordingly. The computer program may be stored in a general medium such as an SD memory Card™.

The input unit 712 is used by a user of the probe information processing system when the user inputs commands, for example. Specifically, the input unit 712 is used to specify a size and a shape of the voxels, which are defined by the first defining unit 7. The input unit 712 is also used to specify the space, in which voxels are defined. The input unit 712 may be a pointing device (e.g., a mouse, a light pen, a touch sensitive panel that works with content on a display), a keyboard, or an audio input device (e.g., a microphone).

The output unit 713 includes a display and displays information relating to a three-dimensional map drawn based on the map database 3, voxels defined by the first defining unit 7, and the results of the statistical process executed by the first statistical processing unit 13. The output unit 713 may include an audio transmitting unit and may output the information using audio.

The interface unit 714 connects the probe information processing system 71 with a wireless network and the like.

Although the present invention has been described in detail with reference to exemplary embodiments, it is to be understood that the present invention is not limited by the disclosed examples, and that numerous additional modifications and variations could be made thereto by a person skilled in the art without departing from the scope of the invention.

It should be noted that the use of "a" or "an" throughout this application do not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A probe information processing system comprising:
 a probe information storing unit configured to store probe information items of a vehicle;
 a first defining unit configured to define voxels in a three-dimensional space based on map data;
 a voxel storing unit configured to store therein the voxels defined by the first defining unit in association with position information of the voxels;
 a first voting unit configured to refer to the voxel storing unit and the probe information storing unit and give, as votes, the probe information items to the voxels that correspond to position information of the respective probe information items;
 a first statistical processing unit configured to execute a statistical process to the probe information items given to each of the voxels by the first voting unit; and
 an associating unit configured to associate process results provided by the first statistical processing unit with the respective voxels.

2. The probe information processing system according to claim 1, wherein the first defining unit defines, based on the map data and a road information that corresponds to the map data, the voxels so that the voxels have different structures according to the road information.

3. The probe information processing system according to claim 1, further comprising: a second defining unit configured to redefine structures of the voxels stored in the voxel storing unit based on a road information that serves as the map data, wherein:
 the voxel storing unit stores therein the redefined voxels; and
 the first voting unit gives, as the votes, the probe information items to the redefined voxels based on position information of the respective redefined voxels.

4. The probe information processing system according to claim 1, further comprising:
 a second defining unit configured to redefine structures of the voxels stored in the voxel storing unit based on the process results of the first statistical processing unit and store the redefined voxels in the voxel storing unit;

a second voting unit configured to refer to the voxel storing unit and the probe information storing unit and give, as the votes, the probe information items to the redefined voxels that correspond to the position information of the respective probe information items; and a second statistical processing unit configured to execute a statistical process to the probe information items given by the second voting unit to each of the redefined voxels.

5. The probe information processing system according to claim 1, wherein:

the voxels defined by the first defining unit includes a first voxel and a second voxel, each of which occupies an identical space, the first voxel receiving, as the vote, one of the probe information items satisfying a first condition, and the second voxel receiving, as the vote, another one of the probe information items satisfying a second condition different from the first condition;

the voxel storing unit stores therein the first voxel and the second voxel; and the first voting unit gives, as the votes, the one of the probe information items, which satisfies the first condition, to the first voxel and the another one of the probe information items, which satisfies the second condition, to the second voxel.

6. The probe information processing system according to claim 1, wherein:

the probe information items include occupancy region information that corresponds to a region occupied by the vehicle in the three-dimensional space; and the first voting unit gives, as the votes, the probe information items to all of the voxels, which overlap with the occupancy region information of the probe information items, based on the occupancy region information.

7. The probe information processing system according to claim 1, wherein the voxel storing unit stores therein the voxels defined by the first defining unit in association with respective voxel identifiers, which identify the respective voxels, the probe information processing system further comprising:

an extended probe information generating unit configured to generate, depending on a size of the vehicle that serves as one of the probe information items given to one of the voxels by the first voting unit, an extended probe information item, which is given to an adjacent one of the voxels located adjacent to the one of the voxels that receives the one of the probe information items, in association with the voxel identifier of the adjacent voxel; and a second voting unit configured to give, as the vote, the extended probe information item to the adjacent one of the voxels that corresponds to the voxel identifier associated with the extended probe information item, wherein:

the first statistical processing unit executes the statistical process to the probe information items and the extended probe information item given to each of the voxels by the first voting unit and the second voting unit.

8. A method for processing probe information comprising the steps of:

storing probe information items of a vehicle in a probe information storing unit;

defining voxels in a three-dimensional space based on map data by using a first defining unit;

storing, in a voxel storing unit, the voxels defined by the defining of voxels in association with position information of the voxels;

referring to the voxel storing unit and the probe information storing unit and giving, as votes, the probe information items to the voxels that correspond to position information of the respective probe information items by using a first voting unit;

executing a statistical process to the probe information items given by the giving of the probe information items by using a first statistical processing unit; and associating process results of the executing of the statistical process with the respective voxels by using an associating unit.

9. The method according to claim 8, wherein:

the defining of the voxels in the three-dimensional space includes defining, based on the map data and road information that corresponds to the map data, the voxels so that the voxels have different structures according to the road information.

10. The method according to claim 8, further comprising the step of:

redefining structures of the voxels stored in the voxel storing unit based on a road information that serves as the map data by using a second defining unit, wherein;

the storing of the voxels in the voxel storing unit includes storing the redefined voxel in the voxel storing unit; and the giving of the probe information items includes giving, as the votes, the probe information items to the redefined voxels based on position information of the respective redefined voxels.

11. The method according to claim 8, further comprising the steps of:

redefining structures of the voxels stored in the voxel storing unit based on the process results of the executing of the statistical process and storing the redefined voxels in the voxel storing unit by using a second defining unit;

referring to the voxel storing unit and the probe information storing unit and giving, as the votes, the probe information items to the redefined voxels that correspond to position information of the respective probe information items by using a second voting unit; and executing a statistical process to the probe information items, which are given by the giving of the probe information items to the redefined voxels, to each of the redefined voxels by using a second statistical processing unit.

12. The method according to claim 8, wherein:

the voxels defined by the defining of the voxels include a first voxel and a second voxel, each of which occupies an identical space, the first voxel receiving, as the vote, one of the probe information items satisfying a first condition, the second voxel receiving another one of the probe information items satisfying a second condition different from the first condition;

the storing of the voxels in the voxel storing unit includes storing the first voxel and the second voxel in the voxel storing unit; and the giving of the probe information items includes giving, as the votes, the one of the probe information items, which satisfies the first condition, to the first voxel and the another one of the probe information items, which satisfies the second condition, to the second voxel.

13. The method according to claim 8, wherein:
the probe information includes occupancy region information that corresponds to a region occupied by the vehicle in the three-dimensional space; and
the giving of the probe information items includes giving the probe information items to all of the voxels, which overlap with the occupancy region information of the probe information items, based on the occupancy region information.

14. The method according to claim 8, wherein:
the storing of the voxels in the voxel storing unit includes storing the voxels, which are defined by the defining of the voxels, in association with respective voxel identifiers, which identify the respective voxels, the method further comprising the steps of:
generating, depending on a size of the vehicle that serves as one of the probe information items given to one of the voxels by the giving of the probe information items, an extended probe information item, which is given to an adjacent one of the voxels located adjacent to the one of the voxels that receives one of the probe information items, in association with the voxel identifier of the adjacent one of the voxels by using an extended probe information generating unit; and
giving, as the vote, the extended probe information item to the adjacent one of the voxels that corresponds to the voxel identifier associated with the extended probe information item by using a second voting unit, wherein:
the executing of the statistical process further includes executing the statistical process to the probe information items and the extended probe information item given to each of the voxels by the giving of the probe information items and the giving of the extended probe information item.

15. A tangible non-transitory computer-readable storage medium containing a computer program for processing probe information, the computer program configured to cause a computer to function as:
a probe information storing means for storing probe information items of a vehicle;
a first defining means for defining voxels in a three-dimensional space based on map data;
a voxel storing means for storing therein the voxels defined by the first defining means in association with position information of the voxels;
a first voting means for referring to the voxel storing means and the probe information storing means and giving, as votes, the probe information items to the voxels that correspond to position information of the respective probe information items;
a first statistical processing means for executing a statistical process to the probe information items given to each of the voxels by the first voting means; and
an associating means for associating process results provided by the first statistical processing means with the respective voxels.

16. The tangible non-transitory computer-readable storage medium according to claim 15, wherein the first defining means defines, based on the map data and road information that corresponds to the map data, the voxels so that the voxels have different structures according to the road information.

17. The tangible non-transitory computer-readable storage medium according to claim 15, the computer program further configured to cause the computer to function as second defining means for redefining structures of the voxels stored in the voxel storing means based on road information that serves as the map data, wherein:
the voxel storing means stores therein the redefined voxel; and
the first voting means gives, as the votes, the probe information items to the redefined voxels based on position information of the respective redefined voxels.

18. The tangible non-transitory computer-readable storage medium according to claim 15, the computer program further configured to cause the computer to function as:
second defining means for redefining structures of the voxels stored in the voxel storing means based on the process results of the first statistical processing means and store the redefined voxels in the voxel storing means;
second voting means for referring to the voxel storing means and the probe information storing means and give, as the votes, the probe information items to the redefined voxels that correspond to the position information of the respective probe information items; and
second statistical processing means for executing a statistical process to the probe information items given by the second voting means to each of the redefined voxels.

19. The tangible non-transitory computer-readable storage medium according to claim 15, wherein:
the voxels defined by the first defining means includes a first voxel and a second voxel, each of which occupies an identical space, the first voxel receiving, as the vote, one of the probe information items satisfying a first condition, and the second voxel receiving, as the vote, another one of the probe information items satisfying a second condition different from the first condition;
the voxel storing means stores therein the first voxel and the second voxel; and
the first voting means gives, as the votes, the one of the probe information items, which satisfies the first condition, to the first voxel and the another one of the probe information items, which satisfies the second condition, to the second voxel.

20. The tangible non-transitory computer-readable storage medium according to claim 15, wherein:
the probe information items include occupancy region information that corresponds to a region occupied by the vehicle in the three-dimensional space; and
the first voting means gives, as the votes, the probe information items to all of the voxels, which overlap with the occupancy region information of the probe information items, based on the occupancy region information.

21. The tangible non-transitory computer-readable storage medium according to claim 15, wherein the voxel storing means stores therein the voxels defined by the first defining means in association with respective voxel identifiers, which identify the respective voxels, the computer program further configured to cause the computer to function as:
extended probe information generating means for generating, depending on a size of the vehicle that serves as one of the probe information items given to one of the voxels by the first voting means, an extended probe information item, which is given to an adjacent one of the voxels located adjacent to the one of the voxels that receives the one of the probe information items, in association with the voxel identifier of the adjacent voxel; and second voting means for giving, as the vote, the extended probe information item to the adjacent one of the voxels that corresponds to the voxel identifier associated with the extended probe information item, wherein:

the first statistical processing means executes the statistical process to the probe information items and the extended probe information item given to each of the voxels by the first voting means and the second voting means.

* * * * *